United States Patent [19]
Asada

[11] Patent Number: 5,883,382
[45] Date of Patent: Mar. 16, 1999

[54] PHOTO-DETECTING DEVICE HAVING OPTICAL AXIS ORIENTING VARIABLE DIRECTION

[75] Inventor: Norihiro Asada, Shouwa-machi, Japan

[73] Assignee: Nihon Shingo Kabushiki Kaisha, Tokyo, Japan

[21] Appl. No.: 941,695

[22] Filed: Oct. 1, 1997

[30] Foreign Application Priority Data

Jun. 7, 1996 [JP] Japan .................. PCT/JP96/01563

[51] Int. Cl.$^6$ .................................................. H01J 40/14
[52] U.S. Cl. ...................................... 250/214.1; 257/531
[58] Field of Search ............................ 250/214.1, 214 R; 257/531, 458, 257, 290

[56] References Cited

U.S. PATENT DOCUMENTS 5,362,960  11/1994  Komatsu et al. ..................... 250/214.1

FOREIGN PATENT DOCUMENTS

| 57-57193 | 10/1983 | Japan . |
| 58-160369 | 10/1983 | Japan . |
| 64-137813 | 5/1989 | Japan . |
| 6-66852 | 8/1994 | Japan . |

*Primary Examiner*—Edward P. Westin
*Assistant Examiner*—Kevin Pyo
*Attorney, Agent, or Firm*—William Squire

[57] ABSTRACT

A movable plate 5 and torsion bars 6 are monolithically formed in a semiconductor substrate 2. A flat coil 7 is formed on peripheries of the movable plate 5 while a photodiode 8 is formed on a central portion of the movable plate 5. Permanent magnets 10A, 10B, 11A and 11B are provided on upper and lower spaces of the peripheries of the movable plate 5 while coils 12A and 12B for detecting a displacement angle of the movable plate 5 are provided on lower spaces of the peripheries of the movable plate 5. Flowing a current into the flat coil 7 generates a driving force depending on a relation with magnetic fields induced by the permanent magnets 10A, 10B, 11A and 11B, which makes the movable plate 5 to rotate axially around the torsion bars 6 to vary an orienting direction of an optical axis of the photodiode 8. The displacement angle of the optical axis is detectable by changes in mutual inductances between the flat coil 7 and the detection coils 12A and 12B, namely, changes in induction voltages of the detection coils 12A and 12B.

5 Claims, 8 Drawing Sheets

OUTPUT FOR DETECTING DISPLACEMENT ANGLE

PHOTO-DETECTING DEVICE HAVING OPTICAL AXIS ORIENTING VARIABLE DIRECTION

BACKGROUND OF THE INVENTION

1. Field of the Invention

The present invention relates to a photo-detecting device and, more particularly, to one which is suitable for monitoring comparatively large objects and targets, for instance, traffic roads, airports and so on.

2. Brief Description of the Prior Art

As such sorts of photo-detecting device as mentioned above, following two types of devices have been investigated:

a) A first type is a device wherein a photo-detecting cell is rotated by a driving motor.

b) A second type is a device wherein many of individual photo-detecting cells are allocated so that the optical axes of photo-detecting cells orient to relatively dispersed directions.

However, the device of the first type encounters with problems that the device is structurally too large to enable a high-speed operation while it is unrealistic from a manufacturing cost point of view.

On the other hand, the device of the second type mentioned above also encounters with another problem that differences in cell characteristics induced between each of the photo-detecting cells are required to be compensated.

SUMMARY OF THE INVENTION

The present invention is carried out in situations mentioned above. An object of the invention is to provide a photo-detecting device which is fabricated so compact as to be capable of a quick scanning operation and of a mass production-induced cost reduction. Another object of the invention is to eliminate any necessity of compensation of the dispersed characteristics induced between the loaded photo-detecting cells simultaneously.

(1) To attain above-mentioned purposes, the present invention is to provide a photo-detecting device having an optical axis orienting to variable directions, comprising;

- a movable plate monolithically formed in a semiconductor substrate,
- a torsion bar monolithically formed in the semiconductor substrate to axially support the movable plate on the semiconductor substrate, allowing the movable plate freely to swing and to rock with respect to the semiconductor substrate,
- a driving coil formed on peripheries of the movable plate,
- a generating means of a magnetic field for applying a static magnetic field to the driving coil, and
- a photo-detecting cell formed on the movable plate;
- wherein a current introduced to flow through the driving coil generates a force to move the movable plate in response to the force to vary an orienting direction of the optical axis of the photo-detecting cell.

(2) To detect a displacement angle of the optical axis, the present invention is to provide the device constituting (1), further comprising a detecting coil which is electromagnetically coupled with the driving coil.

(3) To drive unidimensionally the photo-detecting cell mentioned in (1), the present invention provides herein the device constituting (1), wherein the movable plate constituting (1) is formed of a single plate.

(4) To drive two-dimensionally the photo-detecting cell by modifying the structure of the movable plate constituting (1) into a doubly formed inner structure, the present invention is to provide another photo-detecting device having an optical axis orienting to variable directions, comprising;

- an outer movable plate monolithically formed in a semiconductor substrate,
- a first torsion bar monolithically formed in the semiconductor substrate to support axially the outer movable plate on the semiconductor substrate, allowing the outer movable plate freely to swing and to rock with respect to the semiconductor substrate,
- an inner movable plate monolithically formed inside the outer movable plate,
- a second torsion bar monolithically formed inside the outer movable plate to support axially the inner movable plate on the outer movable plate, allowing the inner movable plate freely to swing and to rock with respect to the outer movable plate, of which axial direction orthogonally intersects another axial direction of the first torsion bar,
- a first driving coil formed on peripheries of the outer movable plate,
- a second driving coil formed on peripheries of the inner movable plate,
- a first generating means of a magnetic field for applying a static magnetic field to the first driving coil,
- a second generating means of another magnetic field for applying another static magnetic field to the second driving coil, and
- a photo-detecting cell formed on the inner movable plate;
- wherein currents introduced to flow through the first and the second driving coils generate forces to move the outer and inner movable plates in response to the forces to vary an orienting direction of the optical axis of the photo-detecting cell.

(5) To detect two-dimentional displacement angles of an optical axis, the invention is to provide the device constituting (4), further comprising a first detecting coil and a second detecting coil which are electromagnetically coupled, respectively, with the first and the second driving coils constituting (4).

DETAILED DESCRIPTION OF PREFERRED EMBODIMENTS

Hereinafter described are the best modes of the present invention corresponding to the preferred embodiments.

EMBODIMENT 1

Figure 1:
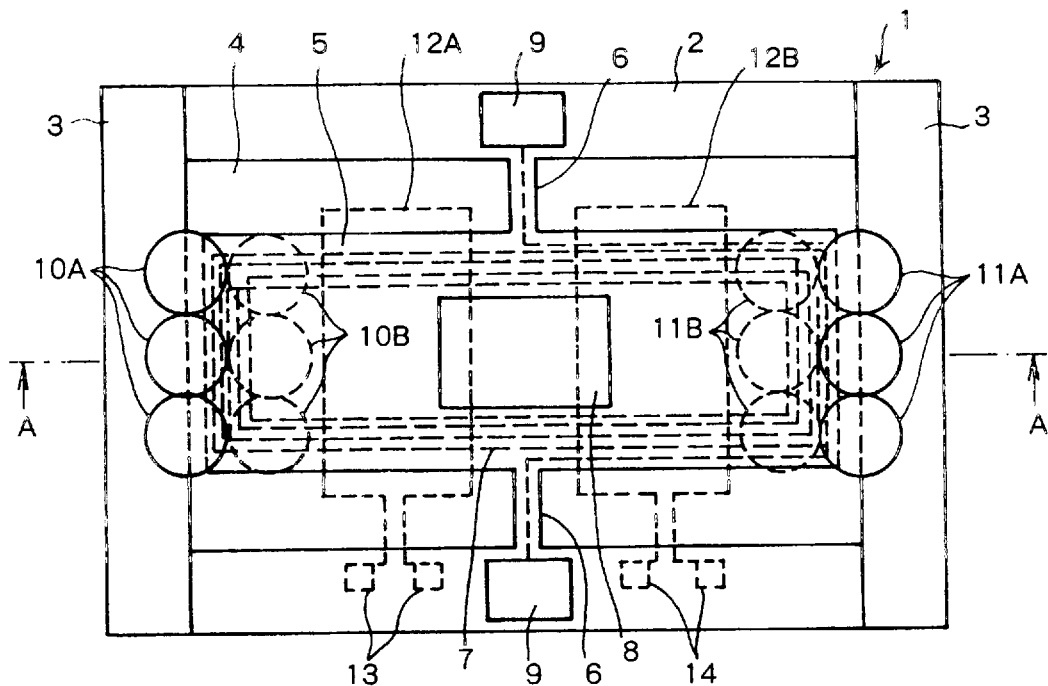
FIG. 1 is a schematic view of Embodiment 1.
Figure 2:
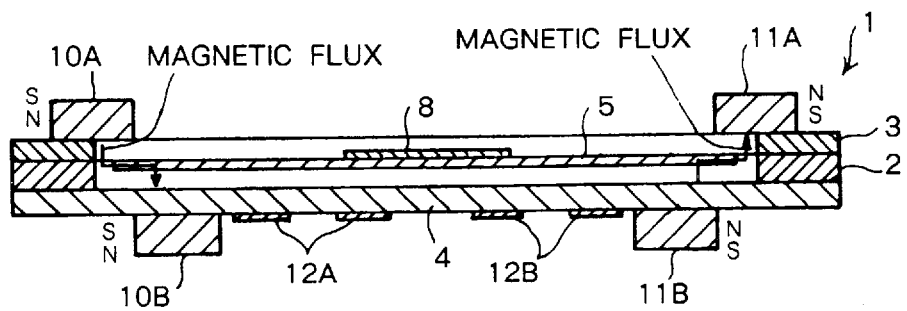
FIG. 2 is a cross-sectional view taken along line A—A of FIG. 1.

FIGS. 1 and 2 are drawings illustrating a constitution of "a photo-detecting device having an optical axis orienting to variable directions" described in Embodiment 1. The device of Embodiment 1 together with Embodiments 2 and 3 operates in the same principle as that of a galvanometer. Incidentally, FIGS. 1 and 2 are shown being exaggerated in size for an easy understanding. The situations of FIGS. 3, 5, 6, 7 and 8 to be shown later are the same as those of FIGS. 1 and 2.

The photo-detecting device 1 having an optical axis orienting to variable directions has a laminate structure composed of three layers as shown in FIGS. 1 and 2. An upper layer of the three is an upper flat glass substrate 3 formed of a borosilicate glass and the like to act as an upper insulating substrate. A lower layer is a lower flat glass substrate 4 similarly formed of another borosilicate glass and the like to act as a lower insulating substrate. A middle layer is a silicon substrate 2 acting as a semiconductor substrate to be sandwiched inbetween two insulating substrates 3 and 4 and bonded with them. Above-mentioned upper glass substrate 3 is laminated on left-hand and right-hand sided edges of the silicon substrate 2 (as shown in FIG. 1) to release an upper portion of a movable plate 5 to an open air, which is to be expressed later.

The flat-shaped movable plate 5 and torsion bars 6, the latters of which axially support the movable plate 5 on central positions of the silicon substrate 2 allowing a vertical swinging and rocking motion of the movable plate 5 against the silicon substrate 2, are monolithically formed in the semiconductor substrate utilizing an anisotropic etching technology used in semiconductor device manufacturing process. Accordingly, the movable plate 5 and the torsion bars 6 are both formed of the same material as that of the silicon substrate 2. On peripheries of a front surface of above-mentioned movable plate 5, a flat coil 7 formed of a copper thin-film and covered with an insulating film, wherein both a driving current to drive the movable plate 5 and a superimposed detecting current to detect a displacement angle flow, is provided. Above-mentioned detecting current is to detect the displacement of the movable plate 5 depending upon mutual inductances between the flat coil 7 and detecting coils 12A and 12B.

Resistivity of a coil herein induces a heat loss due to Joule's law. Because a high density integration of the high resistive thin-film coil as the flat coil 7 limits a driving force due to the heat loss, afore-mentioned flat coil 7 of Embodiment 1 is formed by an electrocasting coil forming process utilizing a well-known electrolytic plating technology. In the electrocasting coil forming process, a thin nickel layer is first deposited on a substrate by a use of sputtering technology. A copper layer is next formed on the nickel layer by the electrolytic plating. Both the thick copper layer and the thin nickel layer are finally removed except for an area, which corresponds to the coil, to form a thin-film flat coil composed of the copper layer and the nickel layer. The electrocasting coil forming process has a characteristic property that it is capable of a high density integration of low resistive coils, which is effective for down-sizing and slenderizing of micromagnetic devices.

A photo-diode 8 acting as the photo-detecting cell is herein formed by a well-known technology on a central portion of the front surface of the movable plate 5 which is enclosed by the flat coil 7. Furthermore, a pair of electric terminals 9 and 9 to be electrically interconnected via the torsion bars 6 to the flat coil 7 are simultaneously formed with the formation of the flat coil 7 by the electrocasting coil forming process in the vicinities of the torsion bars 6 on the silicon substrate 2.

As can be seen (from FIG. 1), on a left-hand side of the upper glass substrate 3 and on a left-hand side of a rear surface of the lower glass substrate 4, there are provided disk-shaped permanent magnets 10A and 10B, which constitute pairs to each other. There are also provided another disk-shaped permanent magnets 11A and 11B, which constitute another pairs to each other on a right-hand side of the upper glass substrate 3 and on a right-hand side of the rear surface of the lower glass substrate 4. Those magnets are provided intending to apply magnetic fields to two opposite ends of the flat coil 7, which run parallel to an axial direction of the torsion bars 6. The permanent magnets 10A and 10B which constitute vertically three pairs to each other are aligned so that each polarity of the upper magnets coincides with that of the lower magnets, for instance, each magnet has a north (referred to as "N") pole downwards and a south (referred to as "S") pole upwards as shown in FIG. 2. Similarly, another permanent magnets 11A and 11B, which constitute vertically another three pairs, are also aligned so that each polarity of the upper magnets coincides with that of the lower magnets, for instance, each magnet has an S pole downwards and an N pole upwards as shown in FIG. 2. Furthermore, the permanent magnets 10A and 11A, which are both formed on the upper glass substrate 3, have reversely aligned polarities to each other while another permanent magnets 10B and 11B, which are both formed on the lower glass substrate 4, have also reversely aligning polarities to each other as can been seen from FIG. 2.

As mentioned before, a pair of coils 12A and 12B together with two pairs of electric terminals 13 and 14 are simultaneously provided by a patterning method on the rear surface of the lower glass substrate 4. Ends of the coil 12A are electrically interconnected with the electric terminals 13 while ends of another coil 12B are electrically interconnected with another electric terminals 14. The pair of coils 12A and 12B are set up so as to be capable of an electromagnetic coupling with the flat coil 7. (Incidentally, those coils are schematically illustrated as a single-turned broken line in FIG. 1 but they are actually wound in a plural-turned winding.) The detecting coils 12A and 12B are located on symmetric positions with respect to torsion bars 6 to each other to detect the displacement angle of the movable plate 5. The mutual inductance between the flat coil 7 and one of both detecting coils 12A and 12B increases as their distance decreases while another mutual inductance between the flat coil 7 and another of both detecting coils 12A and 12B decreases as their distance increases, depending on a change in displacement angle of the movable plate 5. Those changes in mutual inductance are detectable by measuring signal voltages output from the detecting coils 12A and 12B, for instance, utilizing differential amplification when a current for detecting a displacement flows through the flat coil 7 being superimposed on the driving current. Consequently, the displacement angle of the movable plate 5 is detectable as the output signal change.

Next, operations of the device are to be described.

Figure 3:
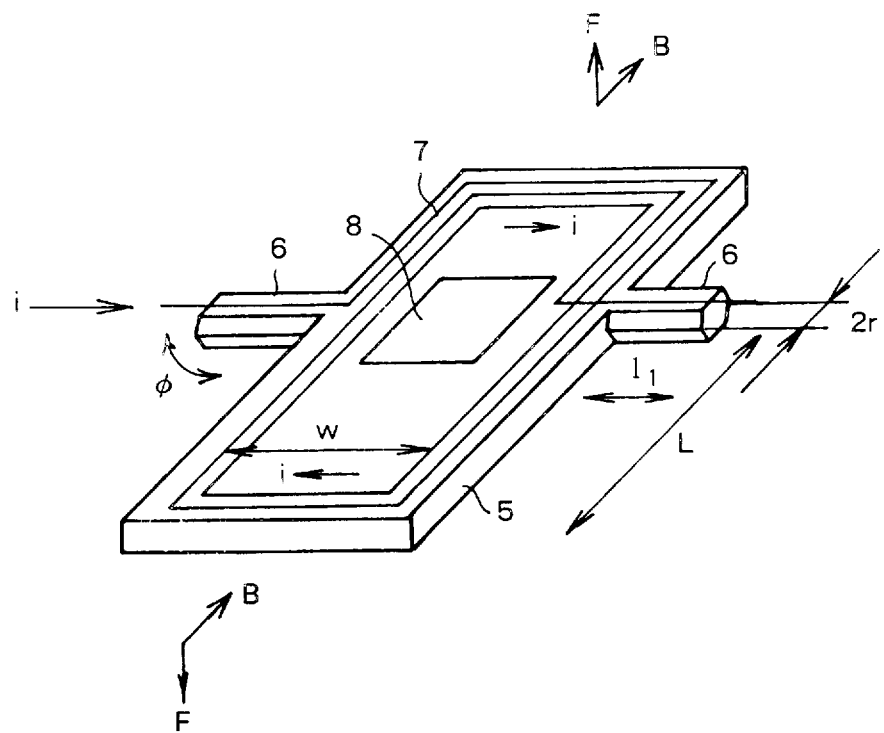
FIG. 3 is a perspective view illustrating operations of Embodiment 1.

For instance, a current flows through the flat coil 7 between the pair of the electric terminals 9 and 9, one of them being as a plus electrode and another being as a minus electrode. On both ends of the movable plate 5, magnetic fields traversing on the flat coil 7 parallel to a plane of the movable plate 5, of which directions are designated by arrows B shown in FIG. 3, are applied by the permanent magnets 10A and 10B and by the another permanent magnets 11A and 11B. When the current flows through the flat coil 7 located in those magnetic fields, forces F are generated on both ends of the flat coil 7, namely of the movable plate 5, depending on a current density and a flux density of magnetic induction, in the directions in accordance with the Flemming's left hand law about current, flux density and force (represented by arrows F shown in FIG. 3). Those forces are obtained from Lorentz'force.

The force F is obtainable in Formula (1), wherein the current density of the current flowing through the flat coil 7 is denoted by i and the flux density of magnetic induction induced by the upper and the lower permanent magnets is denoted by B, as shown below:

$$F = i*B \qquad (1).$$

Actually, the force F is calculated from Formula (2), wherein n stands for a wire turn number of the flat coil 7 and w stands for a peripheral length of the flat coil 7 that the force F works on (as shown in FIG. 3), as follows:

$$F = n*w*(i*B) \qquad (2).$$

On the other hand, the displacement angle Phi of the movable plate 5 is expressed in following Formula (3) utilizing a recoiling force F' of the torsion bars 6 as follows:

$$Phi = (Mx/G*Ip) = F'*(L/8.5E9*r^4) \qquad (3).$$

Herein Mx is a torsional monent, G is a lateral elastic coefficient and Ip is a polar sectional secondary moment while L, l1 and r are a distance from a central axis of the torsion bars to a force point, l1 is a length of the torsion bars 6 and r is a radius of the torsion bars 6, respectively, which are shown in FIG. 3.

The movable plate 5 rotates until the force F balances with the force F'. Therefore, replacement of F' in Formula (3) with F in Formula (2) clarifies that the displacement angle Phi of the movable plate 5 is proportional to the current density i flowing through the flat coil 7.

Consequently, a control of the current density flowing through the flat coil 7 makes it possible to control the displacement angle Phi of the movable plate 5, which accordingly enables to control an orienting direction of the optical axis of the photo-diode 8 freely in a plane perpendicular to the axis of the torsion bars 6. A continuous variation of the displacement angle Phi can scan unidimensionally an object to be inspected.

During control of the displacement angle Phi of the optical axis of this photo-diode 8, a current alternating at least at a hundred-times higher frequency compared with that of the driving current for detecting the displacement angle Phi into the flat coil 7, being superimposed on the driving current. Such a detection current generates induction voltages in detection coils 12A and 12B provided on the rear surface of the lower glass substrate 4, which are induced by the mutual inductance between the coil 12A and the coil 7 together with the another mutual inductance between the coil 12B and the coil 7. When the movable plate 5, namely, the photo-diode 8 is located at a horizontal position, a distance from the detecting coil 12A to the flat coil 7 is equal to a distance from another detecting coil 12B to the flat coil 7, which makes the induction voltages induced in the detecting coils 12A and 12B equal and makes the difference zero. If afore-mentioned driving force rotates the movable plate 5 around the torsion bars 6 as a supporting axis, one of the detection coils 12A (or 12B) approaches the flat coil 7 to raise the induction voltage due to a rise in mutual inductance while another of detection coils 12B (or 12A) recedes from the flat coil 7 to reduce the induction voltage due to a reduction in mutual inductance. Accordingly, the induction voltages induced in the detection coils 12A and 12B vary depending on the displacement angle Phi of photo-diode 8. Measurement of above-mentioned induction voltages enables to detect the displacement angle Phi of the optical axis of the photo-diode 8.

Figure 4:
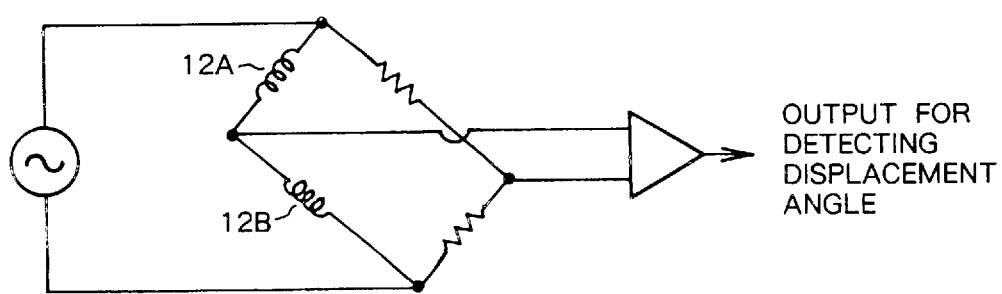
FIG. 4 is a circuit diagram showing a detecting mechanism of a displacement angle of a movable plate in Embodiment 1.

A bridge circuit composed of two resistors beside two detection coils 12A and 12B is supplied, for instance, with an alternating current power supply as shown in FIG. 4. A potential difference between a neutral point of the detection coils 12A and 12B and another neutral point of two resistors is input into a differential amplifier. Feedback of an output from the differential amplifier into a system to control the driving current for driving the movable plate 5 enables a precise control of the displacement angle Phi of the optical axis of the photo-detecting cell 8.

As mentioned above, the present embodiment can make movable components including the photo-detecting cell so miniaturized and so lightweight to be capable of a fast varying the orienting direction of the optical axis of the photo-detecting cell and of a high-speed scanning of the object to be inspected. Furthermore, main components such as the movable plate, the torsion bars and the photodiode are manufacturable from the same semiconductor substrate utilizing a semiconductor device manufacturing process so that a cost reduction effect due to a mass production is expectable. Beside those, it turns unnecessary to compensate variances in characteristics between cells because the target to be inspected is can be scanned by only one photodiode.

EMBODIMENT 2

Figure 5:
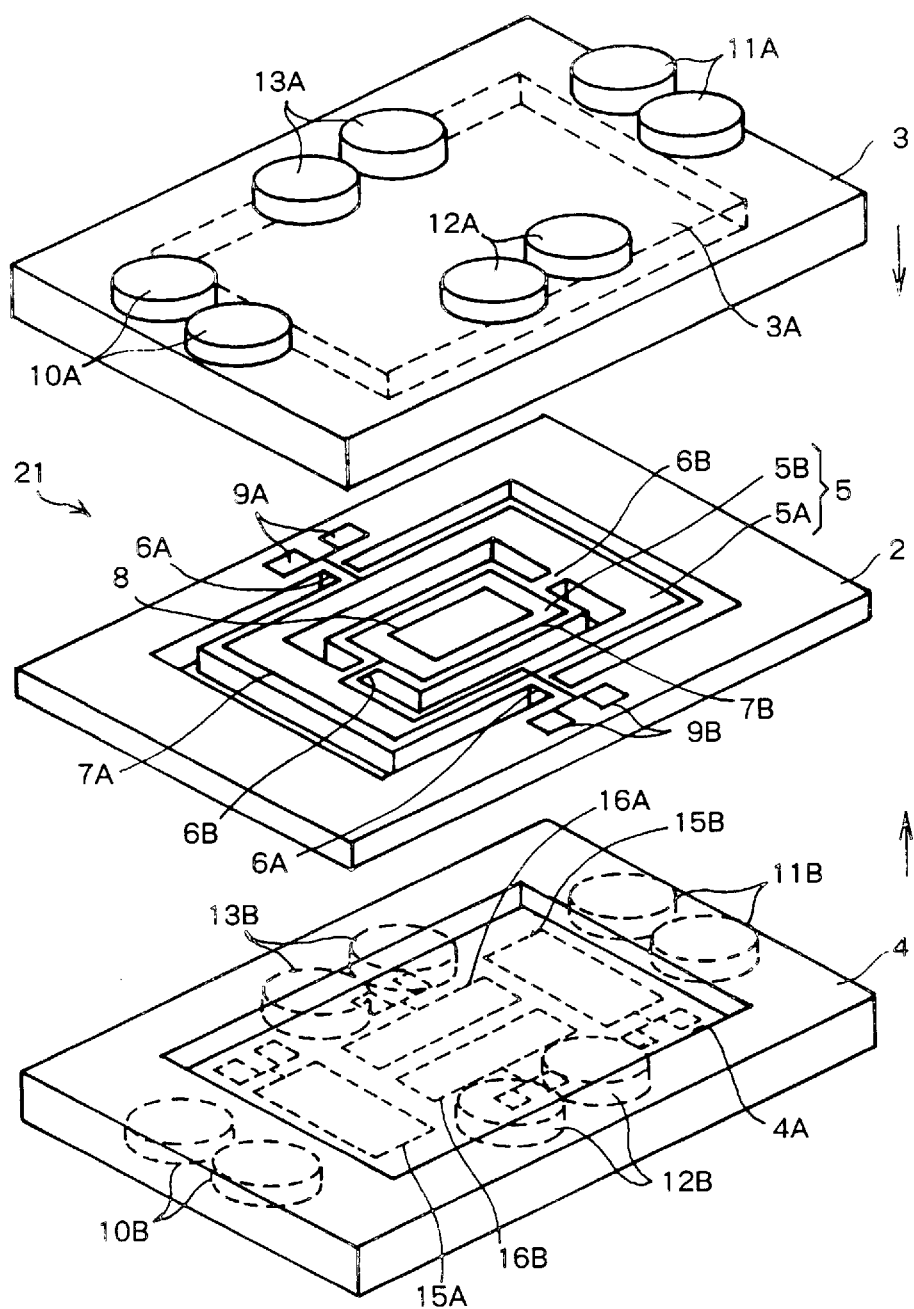
FIG. 5 is perspective views to show a constitution of Embodiment 2.

FIG. 5 is a perspective view showing a constitution of "a photo-detecting device having an optical axis orienting to variable directions" of Embodiment 2.

The present embodiment is an example of biaxial photo-detecting devices wherein two pairs of torsion bars are provided orthogonally intersecting to each other to enable to scan two-dimensionally while Embodiment 1 mentioned above is a photo-detecting device to scan the optical axis unidimensionally. Incidentally, the same numerical signs are to be attached herein to the same components as Embodiment 1 to omit the expression.

As can be seen from FIG. 5, the photo-detecting device having the variable orienting direction-type optical axis 21 according to the present embodiment has upper and lower glass substrates 3 and 4, respectively, formed of a borosilicate glass and the like to act as upper and lower insulating substrates, which are laminated downwards and upwards to the directions represented by arrows shown in the figure onto front and rear surfaces of a silicon substrate 2 to be bonded to form a three-layered structure. The upper and the lower glass substrates 3 and 4 are, respectively, provided with rectangularly shaped concaves 3A and 3B formed, for instance, by an ultra-sonic processing on each central portion of the substrates. When those substrates are laminated to be bonded with the silicon substrate 2, both of concaves are located so as to face the silicon substrate 2. This configuration maintains a movable space of a movable plate 5 having a photo-detecting cell 8 as described later, and encapsulates the movable plate 5.

In afore-mentioned silicon substrate 2, there is provided the movable plate 5 having a flat shape, which is composed of an outer movable plate 5A formed in a frame shape and an inner movable plate 5B axially supported inside the outer movable plate. 5A. Afore-mentioned outer movable plate 5A is axially supported on the silicon substrate 2 by first torsion bars 6A and 6A while afore-mentioned inner movable plate 5B is axially supported by second torsion bars 6B and 6B, of which axial direction orthogonally intersect that of the first torsion bars 6A and 6A, inside the outer movable plate 5A. The movable plates 5A and 5B as well as the first and the second torsion bars 6A and 6B are monolithically formed in the silicon substrate 2 utilizing an anisotropic etching technology to be composed of the same material as that of the silicon substrate 2.

On the other hand, a flat coil 7A (although the coil 7A is schematically designated by a single line in the figure, it is wound in fact in plural turns on the outer movable plate 5A), which is electrically interconnected via a front surface of one of the first torsion bars 6A with a pair of outer electric terminals 9A and 9A formed on the front surface of the silicon substrate 2, is formed on the outer movable plate 5A and covered with an insulating film. Furthermore, a flat coil 7B (although the coil 7B is schematically designated by a single turn in the figure, it is wound in fact in plural turns on the inner movable plate 5B, similarly to the outer movable plate 5A), which is electrically interconnected via a front surface of one of the second torsion bars 6B, via a front surface of the inner movable plate 5B and via a front surface of another of the second torsion bars 6A, with a pair of inner electric terminals 9B and 9B formed on an opposite sided periphery of the front surface of silicon substrate 2, is provided on the inner movable plate 5B and covered with the insulating film. Those flat coils 7A and 7B are formed similarly to Embodiment 1 by afore-mentioned electrocasting coil forming technology utilizing the well-known electrolytic plating method. Afore-mentioned outer and inner electric terminals 9A and 9B herein are formed simultaneously with the flat coils 7A and 7B on the silicon substrate 2 by the use of the electrocasting coil forming technology. On a central portion of the inner movable plate 5B which is spirally encircled with the inner flat coil 7B, a photo-diode 8 acting as a photo-detecting cell is formed by a well-known technology.

On the upper glass substrate 3 and on the rear surface of the lower glass substrate 4, each of eight disk-shaped permanent magnets from 10A to 13A and from 10B to 13B, two of which constitute each of four pairs, is allocated as shown in the figure. The permanent magnets 10A and 11A facing to each other being located on the upper glass substrate 3, which cooperates with the permanent magnets 10B and 11B facing to each other being located on the rear surface of the lower substrate 4, are to apply magnetic fields to the outer flat coil 7A formed on the outer movable plate 5A to generate a force by an interactive effect with a current flowing through the outer flat coil 7A thereby to drive the outer movable plate 5A to rotate. On the other hand, another permanent magnets 12A and 13A facing to each other being located on the other peripheries of the upper glass substrate 3, which cooperates with the other permanent magnets 12B and 13B facing to each other being located on the other peripheries of the rear surface of the lower substrate 4, are to apply magnetic fields to the inner flat coil 7B formed on the inner movable plate 5B to generate another force by the interactive effect with another current flowing through the inner flat coil 7B thereby to drive the inner movable plate 5B to rotate. Furthermore, the permanent magnets 10A and 11A facing to each other are aligned anti-parallel to each other in vertical polarity, for instance, upper poles of the permanent magnets 11A should be the N poles when upper poles of the permanent magnets 10A are the S ones. And that, they are aligned, further, so that a flux trajectory of a magnetic induction induced between them traverses parallel to the flat coils 7 formed on the movable plate 5. Situations are similar between other permanent magnets 12A and 13A, between 10B and 11B and between 12B and 13B, both of which face laterally to each other. Moreover, the permanent magnets 10A and 10B corresponding vertically to each other should be aligned so as to have the same polarities, for instance, the upper poles of permanent magnets 10B should be the S poles if the upper poles of permanent magnets 10A are the S ones. Situations are similar between other permanent magnets 11A and 11B, between 12A and 12B and between 13A and 13B, both of which correspond vertically to each other. Those constitutions generate forces working toward the opposite directions to each other on the opposite sided ends of the movable plate 5.

There are provided detection coils 15A and 15B together with 16A and 16B, which are capable of electromagnetically coupling to afore-mentioned flat coils 7A and 7B, respectively, being patterned on the rear surface of the lower glass substrate 4. The detection coils 15A and 15B are allocated on symmetric positions with respect to the first torsion bars 6A while the detection coils 16A and 16B are similarly allocated on symmetric positions with respect to the second torsion bars 6B to constitute pairs, respectively. The pair of the detection coils 15A and 15B is to detect a displacement angle of the outer movable plate 5A by outputing an electric signal corresponding to a change in mutual inductances between the outer movable plate 7A and the detection coils 15A and 15B. The output signal, which is generated by a detection current flowing through the flat coil 7A being superimposed on a driving current, varies depending upon a change in mutual inductances, which is caused by a change in displacement angle of the outer movable coil 5A. The displacement angle of the outer movable plate 5A is detectable by measuring this electric signal. Another pair of detection coils 16A and 16B is to detect on a similar way a displacement angle of the inner movable plate 5B.

Next, operations of Embodiment 2 are expressed.

When the driving current flows through the flat coil 7A formed on the outer movable plate 5A, the outer movable plate 5A rotates rendering the first torsion bars 6A and 6A as supporting points dependently upon a flowing direction of the current. During rotation of the outer movable plate 5A, the inner movable plate 5B also rotates adhering to the outer movable plate 5A. In this case, movement of the photo-diode 8 is the same as that expressed in Embodiment 1. If the driving current flows through the flat coil 7B formed on the inner movable plate 5B on the contrary, the inner movable plate 5B rotates rendering the second torsion bars 6B and 6B as the supporting points with respect to the outer movable plate 5A, in the orthogonal rotating direction with respect to that of the outer movable plate 5A.

Accordingly, after the outer movable plate 5A, for instance, is rotated by controlling the driving current flowing through the flat coil 7A for a certain period of time, the inner movable plate 5B can be displaced to a certain angle by controlling the driving current flowing through the flat coil 7B. The periodic repetition of those operations can swing an optical axis of the photo-diode two-dimensionally, which can scan the object to be monitored two-dimensionally.

Incidentally, an anti-reflective film is preferably coated on a glass surface if there exists the glass substrate above the photodiode 8.

On the other hand, if the detection currents flow being superimposed on the driving currents flowing through each of the flat coils 7A and 7B, the displacement angle of the outer movable plate 5A is detectable in the same principle as that of Embodiment 1 utilizing a differential output from the detection coils 15A and 15B, which is amplified, for instance, via such a circuit as shown in FIG. 4 while the displacement angle of the inner movable coil 5B is detectable utilizing a differential output of the detection coils 16A and 16B. Feedback of those differential outputs to each of the driving systems for the outer movable plate 5A and for the inner movable plate 5B enables a precise control of each displacement angle of the outer movable plate 5A and the inner movable plate 5B. It is needless to say that such a biaxial photo-detecting device as mentioned in the present embodiment requires an installation of two circuits, which are similar to that shown in FIG. 4, to detect both displacements of the outer movable plate and the inner movable plate.

Beside similar effects to those obtained in Embodiment 1, the constitution described in Embodiment 2 enables the two-dimensional scanning operation of the optical axis with respect to the target to be inspected, which spreads the scanning area broader compared with the unidimensional scanning of Embodiment 1. Moreover, because this constitution encapsulates a swinging and rocking space of the movable plate 5 with the upper and the lower glass substrates 3 and 4 and also with the surrounding silicon substrate 2, an air resistance of the movable plate 5 to a rotational motion is eliminated by evacuating the enclosed space, which brings about a rising effect on response speed of the movable plates 5A and 5B.

Furthermore, when large currents are flowed in the flat coils 7A and 7B to enlarge the displacement angles of the movable plates 5A and 5B, it is preferable to fill the encapsulated swinging and rocking space of the movable plates 5A and 5B with some inert gases such as helium, argon and so on instead of the evacuation, particularly preferable to fill with helium, which has the largest heat conductivity among them. The reason why is that heat divergences from the movable plates 5A and 5B worsen in an evacuated ambient when the currents flowing through the flat coils 7A and 7B are enlarged and, consequently, heat generations therefrom are also enlarged. The filling of the inert gas raises heat divergences from the movable plates 5A and 5B compared with in the evacuated ambient to reduce an extent of a high temperature state, which would give an ill effect on device characteristics. The filling of the inert gas on the contrary reduces a little the response speed of the movable plates 5A and 5B compared with the evacuated ambient.

Incidentally, it is also needless to say that the swinging and rocking space of the movable plate 5 of Embodiment 1 can be converted to an encapsulated structure utilizing the same concave portions formed on the upper glass substrate 3 and on the lower glass substrate 4, respectively, as those of Embodiment 2.

EMBODIMENT 3

Figure 6:
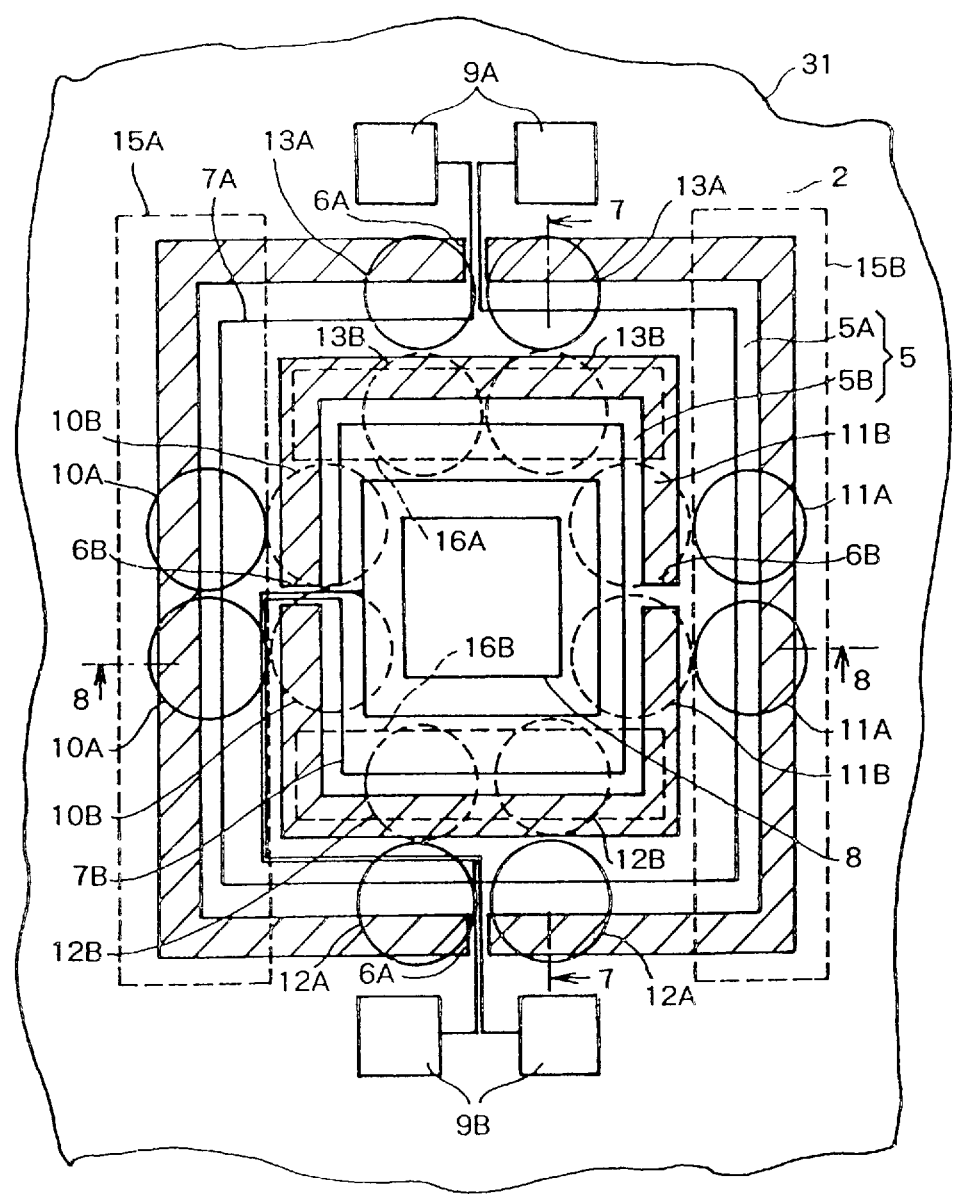
FIG. 6 is a schematic plan view of Embodiment 3.
Figure 7:
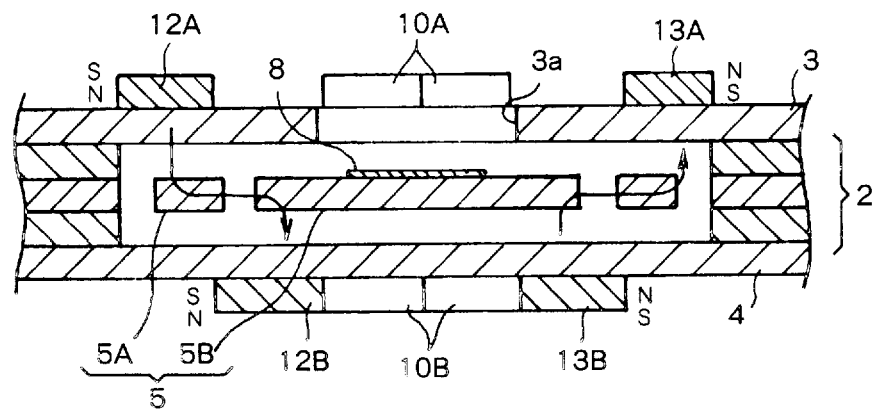
FIG. 7 is a cross-sectional view taken along line 7—7 of FIG. 6.
Figure 8:
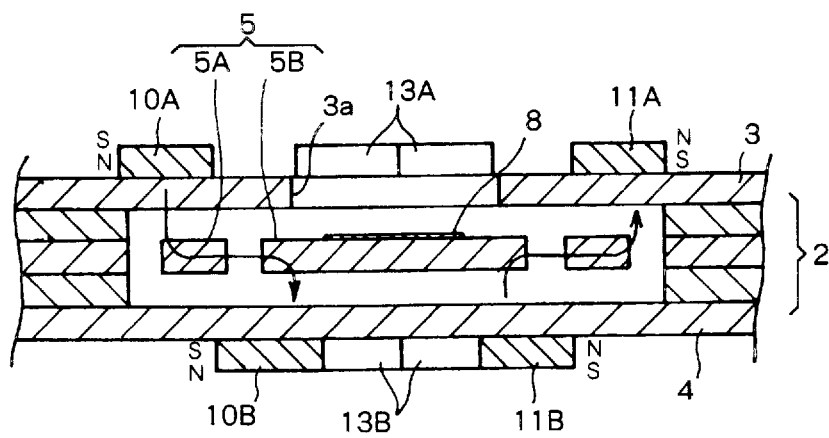
FIG. 8 is a cross-sectional view taken along line 8—8 of FIG. 6.

FIGS. 6, 7 and 8 are a plan view and cross-section views showing a constitution of "a photo-detecting device having an optical axis orienting to variable directions" according to Embodiment 3.

The present embodiment is a biaxial type example of photo-detecting devices, which is equivalent to Embodiment 2. Incidentally, the same numerical symbols as those in Embodiment 2 are attached to the same components herein to omit their expressions.

Although the biaxial photo-detecting device 31 having the variable orienting direction-type optical axis according to the present embodiment has almost the same constitution as that of Embodiment 2, in the present embodiment, however, flat glass plates without concave portions 3A and 3B are used as the upper and the lower glass substrates 3 and 4 in contrast to those of Embodiment 2 as can be seen from FIGS. 6 to 8. The upper glass substrate 3 has a rectangularly opened window 3a at a portion above the movable plate 5 dependently on a shape of the movable plate 5, which exposes the photo-diode 8 to an open air and enables a direct incidence of a light to be detected into the photo-diode 8. Two additional sheets of silicon substrates are laminated on the front and the rear surfaces of the interlaid silicon substrate 2 to form a three-layered silicon laminate. Forming of the movable plate 5 in the interlaid silicon substrate 2, which is located inbetween two additional silicon substrates, guarantees the movable plate 5 the space for rotation.

As can be seen from broken lines shown in FIG. 6, the detection coils 15A and 15B for detecting the displacement angle of the outer movable plate 5A together with the detection coils 16A and 16B for detecting the displacement angle of the inner movable plate 5B are formed on certain positions of the rear surface of the lower glass substrate 4 utilizing a patterning method so as to enable to attain electromagneticcouplings to the corresponding flat coils 7A and 7B.

The operations and the obtained effects of such a constitution as that of the present embodiment are similar to those of Embodiment 2 so that detailed descriptions are omitted.

Modifications

Although a photodiode are formed as a photo-detecting cell in each embodiment mentioned above, photo-detecting cells according to the present invention are not limited to the photodiode but other photo-detecting cells are available, for instance, such as line sensors and area sensors, which are composed of a plurality of photodiodes. Furthermore, a photo-transistor, a photo-conductor, a CCD and so on are also available. A micro lens in use for convergence of an incident light is provided in front of the photo-detecting cell corresponding to necessities.

Though the optical axis is linearly scanned incidentally in Embodiment 2, a coaxial scanning or a spiral scanning is available dependently upon a shape of the object.

On the other hand, although torsion bars axially support the central portions of the movable plates in each embodiments, torsion bars can axially support the other portions of the movable plates, for instance, a right-hand sided edge of the movable plate 5 shown in FIG. 1 according to the present invention. Herein only one detection coil is formed on a left-hand side from the torsion bars of the movable plate 5 to detect the displacement angle.

Furthermore,though the driving current and the detection current are flowed in the flat coil formed on the movable plate in each embodiment, only the driving current can be flowed without superimposing of the detection current if the alternating frequency of the driving current is as high as some kHz.

Moreover, although the differential output between two detection coils is used for detecting the displacement angle in each embodiment, only one detection coil can herein be installed to detect the displacement angle instead.

Usage Examples

Usage examples of photo-detecting device having the variable orienting direction-type optical axis mentioned above are herein to be described with reference to FIGS. 9 to 12.

Figure 9:
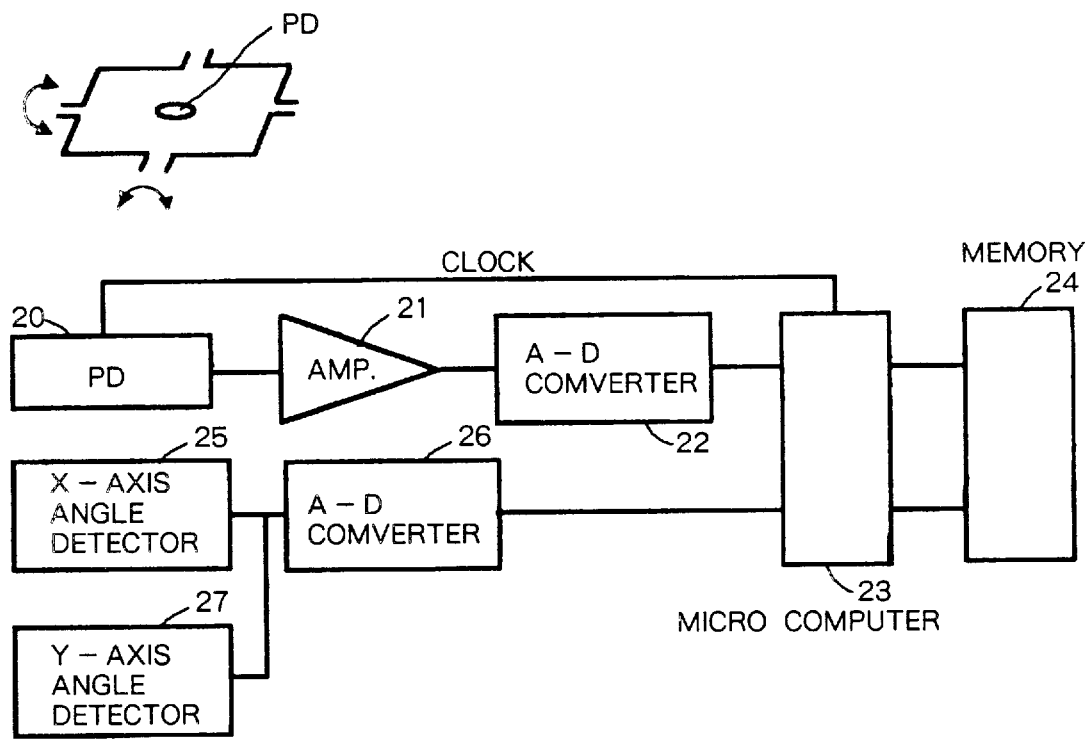
FIG. 9 is a block diagram of a usage example utilizing a photodiode.

FIG. 9 is a block diagram of a usage example for driving biaxially a photo-detecting device utilizing a photodiode PD as a photo-detecting cell. This usage example utilizes such a device as expressed in Embodiments 2 and 3. Embodiment 1 corresponds to the case wherein an axis; for instance, an ordinate of the present usage example is omitted.

Figure 10:
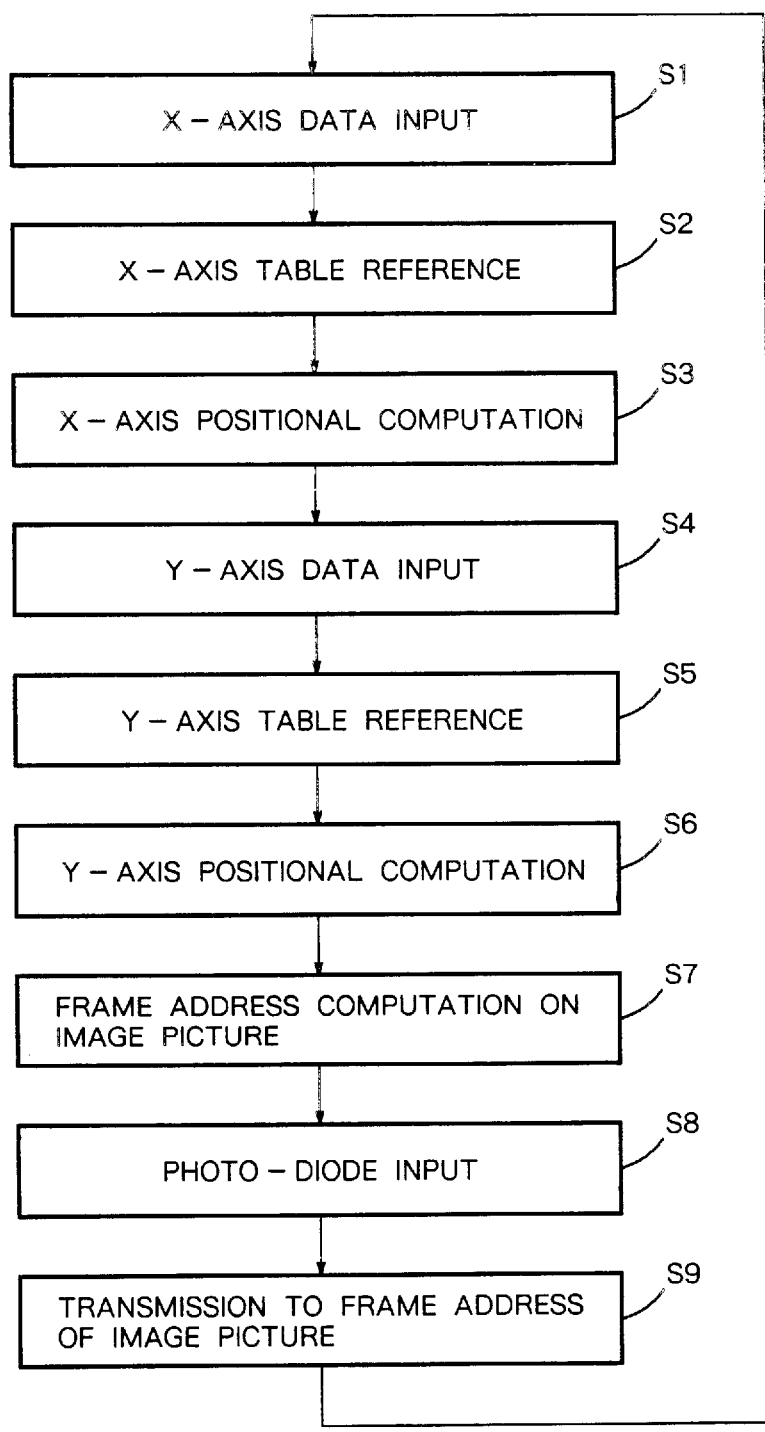
FIG. 10 is a flow chart to describe operations of the usage example shown in FIG. 9.

An operational sequence is to be described with reference to FIG. 10. First at S1 (Step 1), a signal output from an abscissa displacement angle detector 25 including an X-axis detection coil shown in FIG. 9 is converted to a digital data in an A-D (analogue to digital) converter 26 to be input into a microcomputer 23. Second at Step 2, above-mentioned X-axis digital data is referred to an X-axis table. Next at Step 3, a position on the X-axis is computed from the retrieval (reference) data. Then at Step 4, another signal output from a Y-axis displacement angle detector 27 including a Y-axis detection coil is converted to a digital data in the A-D converter 26 to be input into the microcomputer 23. Next at Step 5, above-mentioned Y-axis digital data is referred to a Y-axis table. Then at Step 6, a position on the Y-axis is computed from the retrieval data. At Step 7, a frame address in an image picture is computed from the X-axis and the Y-axis data computed at Steps 3 and 6, respectively. At Step 8, a still another signal output from the photodiode 20 is amplified by an amplifier 21 and converted to a digital data by another A-D converter 22 to be input into the microcomputer 23. Finally at Step 9, above-mentioned digital data of the photodiode is transmitted to afore-mentioned frame address of the image picture stored in a memory system 24 to be recorded. Repetition of operational sequence mentioned above on each frame address of the image picture provides necessary monitoring data of an object to be inspected.

Figure 11:
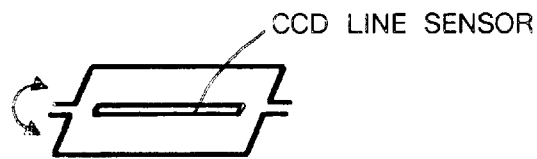
FIG. 11 is a block diagram of another usage example utilizing a line sensor.
Figure 11:
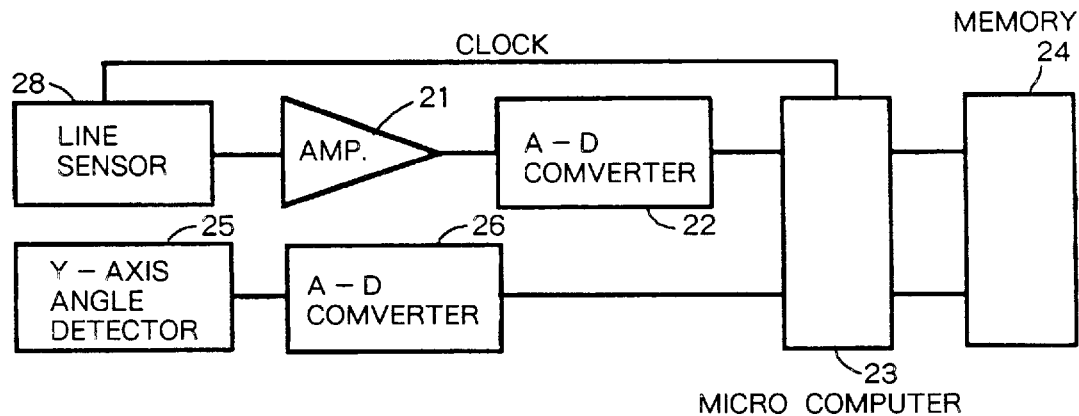

FIG. 11 is a block diagram showing another usage example for driving uniaxially utilizing a CCD line sensor as a photo-detecting cell. In this case, a mechanical swinging of an optical axis of the line sensor 28 scans a target to be monitored in the Y-axis direction while a sequential reading of the signal output from each pixel of the line sensor 28 electrically scans the target to be monitored in the X-axis direction.

Figure 12:
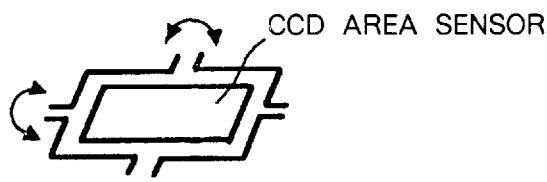
FIG. 12 is a block diagram of still another usage example utilizing an area sensor.
Figure 12:
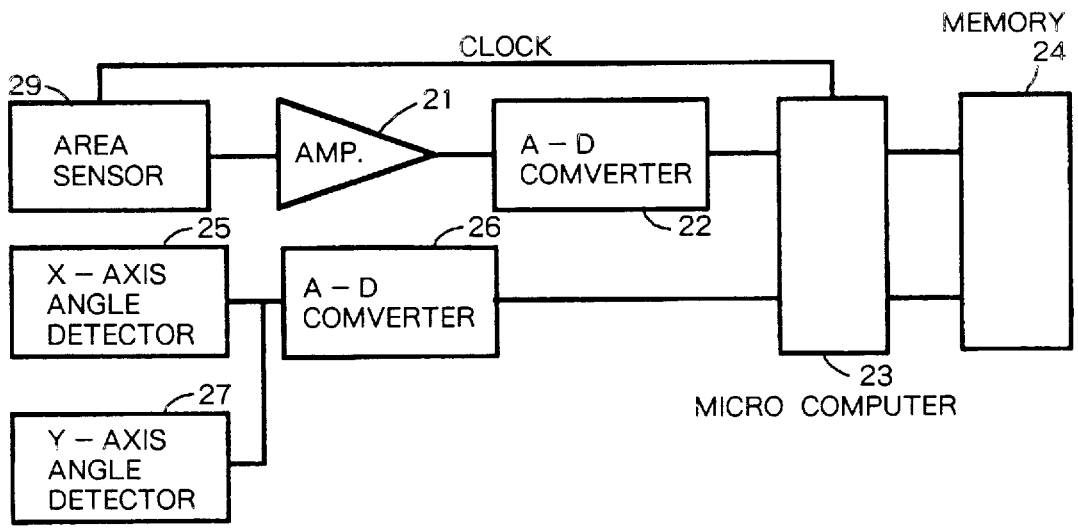

FIG. 12 is a block diagram showing a still another usage example of a biaxial driving utilizing a CCD area sensor as a photo-detecting cell. In that case, a mechanical swinging and rocking of an optical axis of the area sensor 29 in X-axis and Y-axis directions scans the object to be inspected in both axial directions as well as a sequential reading of a signal output from each pixel of the area sensor 29 further minutely scans the object.

As mentioned above, the present invention can provide a compact photo-detecting device capable of a high-speed scanning, of which cost-down is expectable due to a mass production.

Furthermore, the invention according to claim 4 enables a two-dimensional scanning while the inventions according to claims 2 and 5 enable a detection of the displacement angle of the optical axis and a precise control of the displacement angle utilizing feedback of the detected signal.

Industrial Utilization Possibilities

Beside the monitoring use for the large targets such as the traffic roads and the airports described before, the present invention is further utilizable for photosensors, which are equipped in various sorts of instruments in use for extremely precise controls of relatively smaller targets such as bar code scanners, CD-ROM drivers, automatic punching and collecting systems of tickets and so on.

What is claimed is:

1. A photo-detecting device having an optical axis orienting to variable directions, comprising:

a movable plate monolithically formed in a semiconductor substrate;

a torsion bar monolithically formed in said semiconductor substrate axially to support said movable plate on said semiconductor substrate, allowing said movable plate freely to swing and to rock with respect to said semiconductor substrate;

a driving coil formed on peripheries of said movable plate;

a generating means of a magnetic field for applying a static magnetic field to said driving coil; and a photo-detecting cell formed on said movable plate;

wherein a current introduced to flow through said driving coil generates a force to move said movable plate in responce to said force to vary an orienting direction of said optical axis of said photo-detecting cell.

2. A photo-detecting device having an optical axis orienting to variable directions according to claim 1, further comprising a detection coil which is electromagnetically coupled with said driving coil.

3. A photo-detecting device having an optical axis orienting to variable directions according to claim 1, wherein said movable plate is formed of a single monolithic plate.

4. A photo-detecting device having an optical axis orienting to variable directions, comprising:

an outer movable plate monolithically formed in a semiconductor substrate;

a first torsion bar monolithically formed in said semiconductor substrate axially to support said outer movable plate on said semiconductor substrate, allowing said outer movable plate freely to swing and to rock with respect to said semiconductor substrate;

an inner movable plate monolithically formed inside said outer movable plate;

a second torsion bar monolithically formed inside said outer movable plate axially to support said inner movable plate on said outer movable plate, of which axial direction orthogonally intersects another axial direction of said first torsion bar, allowing said inner movable plate freely to swing and to rock with respect to said outer movable plate;

a first driving coil formed on peripheries of said first movable plate;

a second driving coil formed on peripheries of said second movable plate;

a first generating means of a magnetic field for applying a static magnetic field to said first driving coil;

a second generating means of another magnetic field for applying another static magnetic field to said second driving coil; and a photo-detecting cell formed on a said inner movable plate;

wherein currents introduced to flow through said first and said second driving coils generate forces to move said outer movable plate and said inner movable plate in responce to said forces to vary an orienting direction of said optical axis of said photo-detecting cell.

5. A photo-detecting device having an optical axis orienting to variable directions according to claim 4, further comprising a first detection coil and a second detection coil electromagnetically coupled with said first driving coil and said second driving coil, respectively.

* * * * *